March 12, 1957 L. B. PETERSEN 2,784,438
WINDSHIELD WIPER ARM OPERATING MECHANISM
Filed Sept. 8, 1954
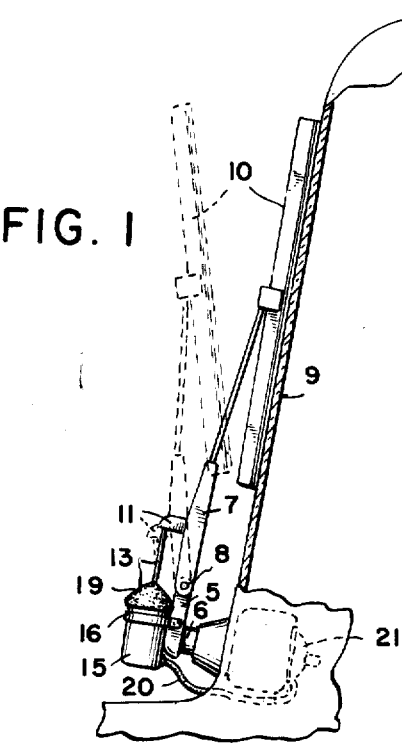
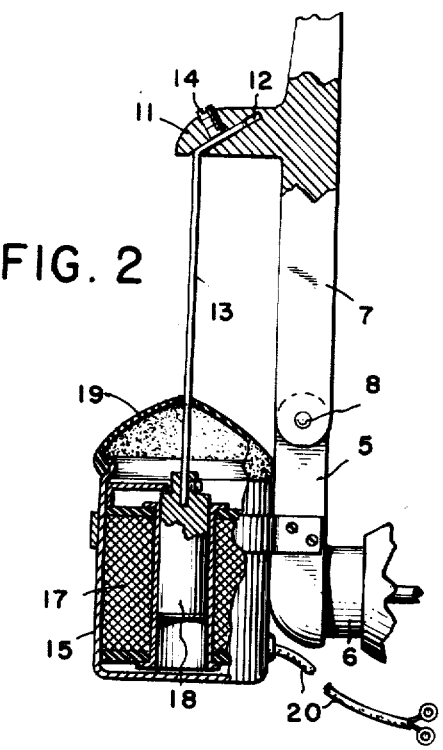
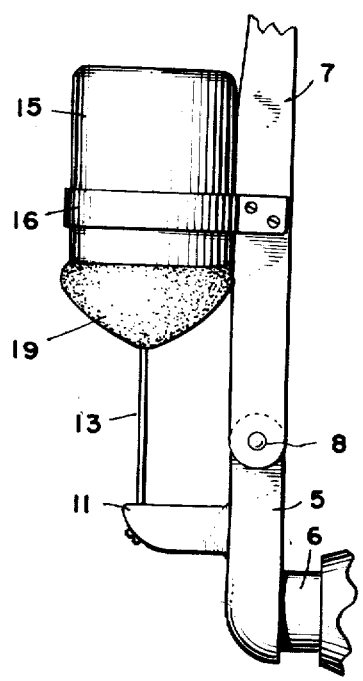
INVENTOR
LEE B. PETERSEN
BY *Ralph Burch*
ATTORNEY

United States Patent Office 2,784,438
Patented Mar. 12, 1957

2,784,438

WINDSHIELD WIPER ARM OPERATING MECHANISM

Lee B. Petersen, Salt Lake City, Utah

Application September 8, 1954, Serial No. 454,693

7 Claims. (Cl. 15—255)

This invention relates to improvements in windshield wipers and has for its object to provide a mechanism for raising the wiper blade out of contact with the windshield and dropping the blade to knock the snow and ice from the windshield so it will not interfere with the normal oscillating movement of the wiper.

A further object of the invention resides in providing electrical operating means for bouncing the wiper blade against the windshield which is under the control of the operator of the vehicle.

Another object of the invention resides in providing a mechanism of the character described which requires no material alterations in the conventional windshield wiper mechanism, is simple and reliable in operation and inexpensive to manufacture.

Other objects and advantages of the invention will be apparent during the course of the following description.

In the accompanying drawing forming a part of this specification and in which like numerals are employed to designate like parts throughout the same, Fig. 1 is a side view of the windshield wiper showing the wiper blade in operative position, Fig. 2 is a fragmentary view of the wiper arm and operating mechanism, with parts in section, and, Fig. 3 is a fragmentary side view of a modified form of wiper arm and operating mechanism.

Referring to the drawings wherein for the purpose of illustration a preferred embodiment of the invention is shown the numeral 5 denotes an oscillating wiper arm mounted on a shaft 6 oscillated by any of the conventional mechanisms now employed to operate windshield wipers of motor vehicles. The arm 5 is relatively short and connected to its free end is a wiper arm 7, hingedly connected thereto by a conventional spring hinge 8 to allow the wiper arm to swing in a direction from and towards the surface of a windshield 9. A wiper blade 10 of conventional construction is pivotally connected in the usual manner to the free end of the wiper arm 7 for movement therewith and upon oscillation of the arm 5 the wiper blade travels in an arcuate path over the surface of the windishield.

The wiper arm 7 adjacent its pivotal connection with the arm 5 is provided with a lateral post 11 having a bore 12 opening through one side of the post to slidably receive the end of a flexible cable 13 adjustably secured in the bore by a set screw 14 mounted in the post. A solenoid 15 is mounted on the arm 5, by a bracket 16, the solenoid having the usual coils 17 and reciprocating armature 18 connected to the other end of cable 13. A flexible boot 19 is attached to the end of the solenoid and surrounds the cable to exclude dust and moisture. The solenoid is connected by electric wires 20 to a manually controlled switch, shown in dotted lines, at 21. The current for operating the solenoid is supplied by the electrical circuit of the motor vehicle.

In operation, the arm 5 upon oscillation swings the wiper blade 10 back and forth across the windshield. When snow or ice accumulates upon the windshield so as to restrict visibility, impede or arrest the oscillating movement of the wiper blade, the operator of the vehicle actuates the switch 21 to intermittently energize the solenoid 15. Upon energizing of the solenoid the armature 18 pulls on the cable 13 to swing the wiper arm 7 on its hinge to lift the wiper blade out of contact with the windshield. When the solenoid is de-energized the wiper blade by the action of the spring hinge 8 moves back into contact with the windshield. By rapidly closing and opening the circuit to the solenoid a bouncing action is imparted to the wiper blade which knocks the snow and ice from the windshield. As the wiper blade is lifted at anytime the solenoid is energized, the wiper blade can be made to bounce against the windshield at any point within the arc of travel of the blade. The bouncing of the blade at all points within the arc of travel of the blade makes the device very efficient in knocking off the snow or ice.

In Fig. 3 a slightly modified form of the device is shown wherein the solenoid 15 is attached by bracket 16 to the wiper arm 7, and the post 11 is formed integral with arm 5. The operatiton of this form of the device is substantially the same in that when the solenoid is energized it pulls on the cable 13 and as the cable is attached to fixed post 11 the wiper arm 7 is caused to swing on its hinge 8 to lift the wiper from the windshield.

It is to be understood that the forms of my invention herein shown and described are preferred examples of the same and changes in the shape, size and arrangement of the parts may be made without departing from the spirit of the invention or scope of the subjoined claims.

Having thus described my invention, I claim:

1. In a windshield wiper comprising an oscillating arm, a wiper arm, a spring hinge connecting said wiper arm to said oscillating arm for movement towards and from the windshield, a wiper blade carried by said wiper arm normally held in contact with the windshield by said spring hinge, a solenoid carried by one of said arms, a post carried by the other of said arms and means connecting the armature of said solenoid and said post for swinging said wiper arm outwardly from the windshield upon energizing said solenoid.

2. In a windshield wiper comprising an oscillating arm, a wiper arm, a spring hinge connecting said wiper arm to said oscillating arm for movement towards and from the windshield, a wiper blade carried by said wiper arm normally held in contact with the windshield by said spring hinge, a solenoid carried by one of said arms having a reciprocating armature, a post carried by the other of said arms, and means connecting the armature of said solenoid to said post for swinging said wiper arm outwardly from the windshield upon energizing said solenoid, said means being adjustably connected to said post.

3. In a windshield wiper comprising an oscillating arm, a wiper arm, a spring hinge connecting said wiper arm to said oscillating arm, a wiper blade carried by said wiper arm normally held in contact with the windshield by said spring hinge, a solenoid carried by one of said arms having a reciprocating armature, and means connecting the armature of said solenoid with the other arm to swing said wiper arm from the windshield upon energizing of said solenoid.

4. In a windshield wiper comprising an oscillating arm, a wiper arm, a spring hinge connecting said wiper arm to said oscillating arm to swing towards and from the windshield, a wiper blade carried by said wiper arm for movement therewith, a solenoid carried by one of said arms having a reciprocating armature, and flexible means connecting the armature of said solenoid and the other of said arms for swinging said wiper arm outwardly from the windshield upon energizing of said solenoid.

5. In a windshield wiper of the character described in claim 4 including means for adjusting said flexible means.

6. In a windshield wiper of the character described in claim 4 including means for controlling said solenoid.

7. In a windshield wiper comprising an oscillating arm, a wiper arm connected at one end to said oscillating arm, a wiper blade carried by the free end of said wiper arm normally held in contact with the windshield by the wiper arm, a solenoid carried by one of said arms having a reciprocating armature, and means connecting the armature of said solenoid with the other of said arms for moving the wiper arm outwardly from the windshield upon energizing of said solenoid.

References Cited in the file of this patent

FOREIGN PATENTS 111,683     Australia _____ Apr. 15, 1939